(12) United States Patent
Kecskemeti et al.

(10) Patent No.: US 10,706,081 B2
(45) Date of Patent: Jul. 7, 2020

(54) QUALITY OF LOCATION-RELATED CONTENT

(71) Applicant: Oath Inc., New York, NY (US)

(72) Inventors: Csaba Kecskemeti, San Jose, CA (US); Gergely Timar, Sunnyvale, CA (US)

(73) Assignee: Oath Inc., New York, NY (US)

(*) Notice: Subject to any disclaimer, the term of this patent is extended or adjusted under 35 U.S.C. 154(b) by 23 days.

(21) Appl. No.: 15/230,731

(22) Filed: Aug. 8, 2016

(65) Prior Publication Data

US 2018/0039855 A1    Feb. 8, 2018

(51) Int. Cl.
*G06F 16/29* (2019.01)
*G06Q 30/02* (2012.01)
*G06F 21/62* (2013.01)
*G06T 3/40* (2006.01)

(52) U.S. Cl.
CPC .......... *G06F 16/29* (2019.01); *G06F 21/6254* (2013.01); *G06Q 30/0261* (2013.01); *G06T 3/4007* (2013.01); *G06F 2221/2111* (2013.01)

(58) Field of Classification Search
CPC .......... G06F 17/30241; G06F 21/6245; G06F 17/5009; G06F 9/3004; G06F 9/3802; G06F 21/6254; G06F 16/29; G06F 2221/2111; G06Q 30/0261; G06K 9/4671; G06T 3/4007; G06T 3/40

USPC ......................................... 382/298, 299, 300
See application file for complete search history.

(56) References Cited

U.S. PATENT DOCUMENTS

2013/0325856 A1* 12/2013 Soto Matamala .. G06F 17/3089
707/724

OTHER PUBLICATIONS

Zargham, Mehdi. Computer Architecture. Prentice Hall, 1996, Chapter 2.*
Gonzalez, Rafael C. and Richard E. Woods. Digital Image Processing. Prentice Hall, 2007, pp. 65-67 and 87-89.*
Gonzalez, Rafael C. and Richard E. Woods. Digital Image Processing. Prentice Hall, 2007, pp. 55-58.*
Gomez-Gil et. al., "A Kalman Filter Implementation for Precision Improvement in Low-Cost GPS Positioning of Tractors", Nov. 8, 2013, 17 pages.

* cited by examiner

*Primary Examiner* — Geoffrey E Summers
(74) *Attorney, Agent, or Firm* — Cooper Legal Group, LLC

(57) ABSTRACT

Briefly, example methods, apparatuses, and/or articles of manufacture are disclosed that may be implemented, in whole or in part, using one or more computing devices to facilitate and/or support one or more operations and/or techniques for improving quality of location-related content, such as truncated location-related content, for example, while preserving and/or maintaining user privacy.

22 Claims, 5 Drawing Sheets

QUALITY OF LOCATION-RELATED CONTENT

BACKGROUND

1. Field

The present disclosure relates generally to content processing systems.

2. Information

In some instances, location-related content, such as geographic coordinates corresponding to particular locations of client devices, such as mobile and/or stationary computing devices, for example, may be collected and/or used, at least in part, to provide customers with personalized messages, targeted offers, more relevant on-line content, or the like. For example, a location-specific message, offer, coupon, or the like may be communicated to a location-aware mobile device, such as via push technology, as one example, while a co-located user is proximate to (e.g., near, walking by, etc.) a particular store, section of a store, or the like. As another example, a location-specific message, offer, coupon, or the like may be communicated to a stationary computing device, such as via pull technology, for example, in response to a search query inputted by a user at a particular location.

Since particular user locations may raise privacy concerns, at times, location-related content may be truncated in some manner. For example, at times, location-related content may be truncated by a particular entity, such as an on-line content provider or publisher, as one example, to protect user privacy while running an auction among multiple parties to sell an advertising inventory or space, such as for purposes of location-related sponsored search bidding. A publisher may, for example, round up and/or manipulate certain values of location-related content, such as higher-precision latitude-longitude values, as one possible example, via moving appropriate decimal points or places in an attempt to change a location estimate to a lower level of accuracy (e.g., from a few feet-level accuracy to a hundred feet-level accuracy, etc., from a half-city-block to a city block, etc.). At times, however, truncating location-related content may significantly decrease quality of location estimates, create uncertainty with respect to a user's location and/or user's path or trajectory, etc., which, in turn, may negatively affect personalized messaging or like digital content delivery services. Greater flexibility and/or variety of approaches for improving quality of location-related content, such as for purposes of delivering more tailored and/or more personalized on-line content, for example, while preserving and/or maintaining user privacy may, therefore, be desirable.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
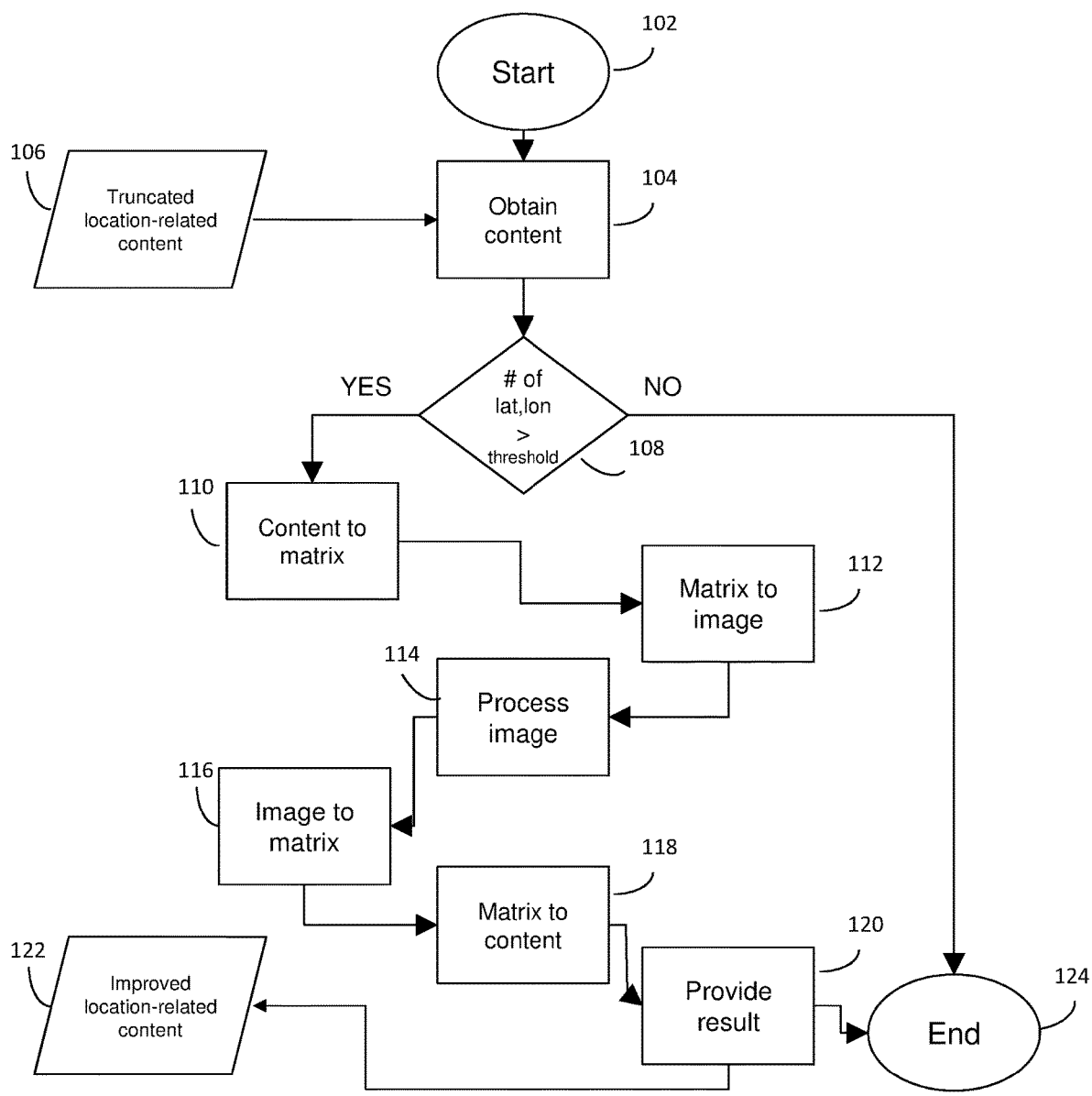
FIG. 1 is a flow diagram illustrating an implementation of a process for improving quality of location-related content.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for improving quality of location-related content, such as implemented in connection with one or more computing and/or communication networks and/or protocols (e.g., network protocols) discussed herein, for example. As alluded to previously, in some instances, location-related content may comprise, for example, truncated location-related content, such as lower-precision geographic coordinates corresponding to locations (e.g., less precise, etc.) of one or more client devices. At times, truncated location-related content may be represented via one or more latitude-longitude values, for example, and may be collected and/or used, at least in part, to provide more targeted offers, more personalized messages, more relevant on-line content, or like electronic documents to one or more client devices, as was indicated. Particular examples of content, location-related or otherwise, will be described in greater detail below. It should be noted that, even though latitude-longitude values are used herein, such as for ease of discussion, any other suitable values, such as altitude values, as another possible example, may be utilized herein, in whole or in part, such as instead of or in any combination with latitude and/or longitude values.

In this context, "client device" refers to any kind of special purpose computing device and/or apparatus capable of communicating with other computing apparatuses and/or devices through wired and/or wireless transmission and/or receipt of signals or like content over suitable computing and/or communications networks according to one or more protocols. Depending, at least in part, on an implementation, a client device may comprise, for example, a mobile device, a stationary device, or any combination thereof. A mobile device may comprise, for example, a client device that may from time to time have a position and/or location that changes. A stationary device may comprise, for example, a client device that may have a position and/or location that typically, although not necessarily, does not change. As a way of illustration, client devices, may include, for example, cellular telephones, satellite telephones, smart telephones, voice over internet protocol (VoIP) or IP telephones, desktop computers, personal digital assistants (PDAs), laptop computers, personal entertainment systems, tablet personal computers (PC), personal audio or video devices, personal navigation devices, e-book readers, or the like. Claimed subject matter is not so limited, of course.

The terms "electronic document" or "web document" may be used interchangeably herein and refer to one or more digital signals, such as communicated and/or stored signals, for example, representing any content including a source code, text, image, audio, video file, or the like. Web documents may, for example, be processed by a special purpose computing device and may be played and/or displayed to or by a user and/or client. A particular example of a special purpose computing device will be discussed in greater detail in connection with FIG. 5. The terms like "user" or "client" may also be used interchangeably herein. At times, web documents may include one or more embedded references or hyperlinks to images, audio and/or video files, or other web documents. For example, one common type of reference may comprise a Uniform Resource Locator (URL). As a way of illustration, web documents may include a web page, news feed, rating and/or review post, question, answer, status update, portal, blog, e-mail, text message, hyperlink, Extensible Markup Language (XML) document, media file, web page pointed and/or referred to by a URL, etc., just to name a few examples.

Thus, as was indicated, at times, location-related content, such as one or more latitude-longitude values, for example, may be truncated for privacy or other reasons, which, in some instances, may make location estimates less than sufficient and/or useful, such as in connection with personalized or like digital content delivery services, just to illustrate one possible implementation. As used herein, "on-line" refers to a type of a communication that may be implemented electronically, such as via one or more suitable communications networks (e.g., wireless, wired, etc.), for example. "Content," as the term used herein, location-related or otherwise, should be interpreted broadly and refers to signals, such signal packets, for example, and/or states, such as physical states on a memory device, for example, but otherwise is employed in a manner irrespective of format, such as any expression, realization, and/or communication, for example. Content may comprise, for example, any information, knowledge, and/or experience, such as, again, in the form of signals and/or states, physical or otherwise. In this context, "electronic," "digital," or "on-line content" refers to content in a form that although not necessarily capable of being perceived by a human, (e.g., via human senses, etc.) may nonetheless be transformed into a form capable of being so perceived, such as visually and/or audibly, for example. Non-limiting examples may include text, audio, images, video, combinations, or the like. Thus, content may be stored and/or transmitted electronically, such as before or after being perceived by human senses. In general, it may be understood that electronic and/or on-line content may be intended to be referenced in a particular discussion, although in the particular context, the term "content" may be employed for ease of discussion. Specific examples of content may include, for example, an e-mail message, text message, audio file, video file, web page, coordinates according to a suitable coordinate system (e.g., global, local, etc.), or any combination thereof. Claimed subject matter is not intended to be limited to these examples, of course.

Continuing with the above discussion, at times, location-related content, such as one or more higher-precision latitude-longitude values, for example, may be truncated via changing and/or moving appropriate decimal points or places for these values so as to intentionally arrive at a lower-accuracy estimate of a location. By way of example but not limitation, to preserve and/or maintain user privacy, in some instances, a location may, for example, be truncated from a few feet-level accuracy, such as covering a half of a city block, to a hundred feet-level accuracy, such as covering a city block, or the like. In turn, a lower-accuracy location estimate may, for example, create uncertainty with respect to a user's particular location, user's route or trajectory, or the like. By way of another example, a truncated location may, for example, prevent or preclude a determination with respect to a particular side of the street (e.g., which side of the street a user is walking, etc.), a particular corner within an intersection, or the like, which, again, may negatively affect delivery of more personalized messages, more targeted offers, or the like. Accordingly, it may be desirable to develop one or more methods, systems, and/or apparatuses that may improve quality of location-related content, such as truncated location-related content, for example, while preserving and/or maintaining user privacy.

Thus, as will be described in greater detail below, in an implementation, truncated location-related content may, for example, be accessed and/or converted into an image, such as via one or more signal processing approaches, which may utilize, in whole or in part, a suitable matrix or like content structure. In turn, an image may, for example, be processed, such as via one or more image processing approaches. For example, an image may be resized, such as via increasing its resolution, as one example, and one or more waypoint values between one or more neighboring image-related values may be interpolated. A resized image may be scaled back or re-scaled, such as to its original size (e.g., an original location representation, etc.), for example, and may be used, at least in part, to reduce false negatives with respect to location estimates, such as in connection with personalized messaging or like digital content delivery services, as one possible example, while maintaining and/or preserving user privacy.

FIG. 1 is a flow diagram illustrating an implementation of an example process 100 that may be performed, in whole or in part, to facilitate and/or support one or more operations and/or techniques for improving quality of location-related content, such as truncated location-related content, for example, while preserving and/or maintaining user privacy. As was indicated, at times, example process 100 may be implemented, at least in part, in connection with one or more signal processing approaches, which may include, for example, one or more image processing approaches. It should be noted that content acquired and/or produced, such as, for example, input signals, output signals, operations, results, etc. associated with example process 100 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

As illustrated, example process 100 may, for example, begin at operation 102 and may proceed to operation 104, such as to obtain truncated location-related content, referenced generally at 106. As was indicated, at times, truncated location-related content 106 may comprise, for example, lower-precision latitude-longitude values, and may be obtained via accessing any suitable database or like repository. For example, in some instances, lower-precision latitude-longitude values may be obtained, at least in part, via accessing a database associated with a particular service provider, on-line content publisher, or the like. Claimed subject matter is not so limited, of course. For example, at times, truncated location-related content may, for example, be provided by any suitable input source and/or process, such as in connection with an auction for sponsored search bidding, or the like. In some instances, truncated location-related content may, for example, be provided via a mobile device analytics application or like process, just to illustrate another possible example. As was indicated, in some instances, lower-precision latitude-longitude values may comprise and/or represent a particular location estimate, such as obtained from a client device associated with a particular user within a given time window (e.g., twelve hours, one day, two weeks, one month, six months, etc.).

At operation 108, a determination may, for example, be made whether a number of obtained latitude-longitude values is more than a certain threshold number, such as to facilitate and/or support further processing. In some instances, this may, for example, be implemented, at least in part, to facilitate and/or support interpolating one or more additional pixels in-between and/or within a range of a discrete set of particular (e.g., known, image-related, etc.) pixels, as discussed below. A threshold number may, for example, be determined, at least in part, experimentally and/or may be pre-set, for example, and/or otherwise dynamically determined depending, at least in part, on a client device, location-related content, particular service provider, application, or the like. By way of example but not limitation, in one particular simulation or experiment, it appeared that a threshold number of between 20 and 25 measured location-related values (e.g., a truncated input content that a process may improve) per 25.0 square kilometers, with precision of 500.0 meters resolution (e.g., a measured location density), and an expected output precision of 10.0 meters resolution, for example, may prove beneficial for improving quality of truncated location-related content, such as in connection with personalized or like digital content delivery services, as one example. It should be noted, however, that, at times, a larger location density, such as in connection with a larger number of location-related values may be prone to overfitting, such as during interpolation, for example. Thus, a process that is reasonably balanced with respect to a number of location-related values and associated geographic area is a desirable goal. Of course, details relating to obtaining latitude-longitude values or a threshold number are merely examples to which claimed subject matter is not limited. For example, in some instances, instead of making this determination in terms of location density, it may be useful to consider a number of location-related values, such as in connection with weights assigned to these values so as to specify pixel intensity in a corresponding image.

Continuing with the above discussion, if a number of obtained latitude-longitude values is less than a threshold number, process 100 may, for example, be terminated, as illustrated at 124. If it is determined, however, that a number of obtained latitude-longitude values is more than a threshold number, example process 100 may, for example, proceed to operation 110, such as to generate a suitable matrix comprising and/or representative of truncated location-related content 106, such as obtained at operation 104. Typically, a matrix may comprise, for example, an array of location-related values, such as represented via numbers, symbols, expressions, or the like, or any combination thereof, such as arranged in a suitable number of rows and columns. Thus, as was indicated, in some instances, an array of location-related values may comprise, for example, an array of latitude-longitude values, just to illustrate one possible implementation. Here, any suitable matrix may, for example, be utilized, in whole or in part, or otherwise considered. For example, at times, a multi-dimensional n×m matrix may be employed, just to illustrate one possible implementation. Thus, for a multi-dimensional n×m matrix, consider, for example:

$n_0$=min(lon)−frame, $n_f$=max(lon)+frame and $m_0$=min(lat)−frame, $m_f$=max(lat)+frame, where $n_0$ and $m_0$ denote latitude and longitude representations of a bottom left corner of a frame, respectively; and $n_f$ and $m_f$ denote latitude and longitude representations of an upper right corner of a frame, respectively, such as to define a square shape frame, as one example, comprising an area for content processing; lat and lon denote latitude and longitude values, respectively; and frame denotes a matrix entry or element to account for buffer or region around truncated location-related values 106. It should be noted that an "n" direction or dimension and an "m" direction or dimension may respectively represent latitude and longitude or, alternatively, longitude and latitude, respectively, such as if used consistently throughout. Here a frame denotes an area for location-related values of interest that may have a higher resolution, such as achievable via signal processing. For example, if a truncated location-related content resolution comprises 100.0 meters, for an example 100,000×100,000 matrix in which an element may represent a 10.0×10.0 meters square area, a better or more useful achievable resolution may comprise 10.0 meters. Claimed subject matter is not so limited, of course. In some instances, a buffer or region around location-related values may, for example, be used, at least in part, to improve quality of truncated location-related content 106 around edges of a matrix, which, at times, may prove beneficial. A buffer or region may, for example, be determined, at least in part, experimentally and/or may be pre-set, for example, and/or otherwise dynamically determined depending, at least in part, on a client device, location-related content, particular service provider, application, or the like. By way of example but not limitation, if a most bottom left location-related value (e.g., latitude coordinate) is 13.34,74.66, such as for an area of interest, at times, it may be useful to add a buffer or region as 13.32, 74.64, such as instead of setting an $n_0$ and $m_0$ to the same or similar value. Further, a value of an $n_I m_J$ element denotes repeat visits to a particular location, such expressed via a number of occurrences of a particular latitude-longitude value in a given location (e.g., a frequency of location estimates for a particular location) obtained within a particular time window, as was indicated.

With regard to operation 112, a matrix comprising obtained truncated location-related values 106 may, for example, be converted into an image, such as a digital image, just to illustrate one possible implementation. In this context, "image" refers to a content structure comprising a finite set of values, such as represented via one or more signals samples capable of being electronically processed, for example, and representative of particular image-related elements. In some instances, image-related elements may comprise, for example, picture elements or so-called "pixels," just to illustrate one possible implementation. A pixel, may typically comprise an individual element of an image, such as capable of being processed via one or more image processing or like approaches. For example, in some instances, a pixel may represent a brightness or intensity of a given color (e.g., grey, etc.) at a specific point within an image, just to illustrate one possible example. Thus, in some instances, an image may comprise, for example, a location-related representation, such as in a digital image format, as one possible example, in which a size of an image may represent a frame size, and a non-zero pixel intensity values may represent estimated locations. Non-zero elements of a corresponding matrix may, for example, represent estimated locations after an image conversion (e.g., interpolation). Prior to such an image conversion, non-zero matrix elements may, for example, represent truncated location-related content. At times, a one-to-one ratio between a given pixel of an image and a latitude-longitude value may, for example, be used, at least in part, or otherwise considered. In some instances, a resolution of location-related content may, for example, be defined via a geographic area covered by a particular image pixel (e.g. one pixel may cover a 100.0 square meters or 10 by 10 area, etc.). Thus, at times, a matrix may, for example, be converted into a digital image, such that an $n_I m_J$ element represents a particular pixel, and a number of occurrences of latitude-longitude values at that particular location, such as obtained within a particular time window, represents pixel intensity. As a way of illustration, in one particular simulation or experiment, a pseudo code, such as implemented in connection with Python Imaging Library (PIL), accessible at www.pythonware.com/products/pil, as one possible example, for an image conversion from a matrix, such as via associated pixels, for example, may include a code illustrated below:

```
from PIL import Image
...
myImage = Image.fromarray(np.uint8(dataArray))
```

At operation 114, an image may, for example, be processed in a suitable manner, such as via one or more image processing approaches. For example, at times, a particular image processing approach may include increasing a resolution of an image and generating and/or obtaining one or more additional pixels or so-called pixel waypoints (e.g., points of interpolation, etc.) in-between and/or within a range of a discrete set of particular (e.g., known, image-related, etc.) pixels, such as via applying a linear interpolation or like operation. It should be noted that any suitable resolution, such as to arrive at a resulting image may, for example, be used, at least in part, or otherwise considered, which may depend, at least in part, on truncated location-related content 106, size of a matrix, processing capability of an associated computing device, application, interpolation, or the like. For example, at times, a resolution may depend on a size of a matrix. By way of example but not limitation, in certain simulations or experiments, it has been observed that, for covering 1.0 square kilometer with 100.0 meters resolution, a 10×10 matrix may be useful. In one particular simulation or experiment, it has also been observed that for 1.0 meter resolution, a 1,000×1,000 matrix may be useful. Of course, claimed subject matter is not so limited. It should be appreciated that, in some instances, a matrix of a larger size may involve more processing and/or computing resources. It should also be noted that, in some instances, such as during interpolation, for example, it may be useful to assign a suitable weight to a contributions of one or more neighboring pixels, such that a nearer neighbor may contribute more to an average than a more distant neighbor. Again claimed subject matter is not so limited.

A resolution of an image may be increased, such as to a suitable detail, for example, via scaling respective dimensions of a corresponding matrix by a suitable factor, such as proportionally (e.g., uniformly, etc.) and/or dynamically. By way of example but not limitation, respective dimensions of an n×m matrix may, for example, be scaled by a factor of 2 to arrive at a 2n×2m matrix, by a factor of 3 to arrive at a 3n×3m matrix, or the like. Claimed subject matter is not limited to a particular scaling factor, of course. Subsequently, a linear interpolation may, for example, be performed again, such as in the other direction so as to scale an image back to its original size in order to generate and/or arrive at an image that includes interpolated pixels representing particular locations on the same or similar scale (e.g., as the original image, etc.). As such, here, a bilinear interpolation may, for example, be utilized, at least in part, to arrive at a higher-resolution image, such as comprising a larger number of pixels than an original image. Thus, consider, for example:

```
processedImage =
myImage.resize((myImage.size[0]*100,myImage.size[1]*100),
Image.BILINEAR)
processedImageOrigScale =
processedImage.resize((myImage.size))
```

Continuing with the above discussion, at operation 116, a processed image may, for example, be converted into a suitable matrix, such as a multi-dimensional n×m matrix discussed above (e.g., of an original or similar size). For example, image-related values representing intensity of corresponding image pixels, including interpolated image-related values, may again be expressed within a matrix as a number of occurrences of latitude-longitude values in a given location (e.g., a location frequency), such as to arrive at an original or like location representation (e.g., in a reversed fashion). It should be noted that, with respect to interpolated image-related values, a number of occurrences of latitude-longitude values may now denote or represent location probability, such as a likelihood of a particular user being in that particular (e.g., interpolated, etc.) location, for example.

With regard to operation 118, a matrix may be converted to location-related content, such as representative of an original or like location representation, for example, but comprising a larger number of location estimates due, at least in part, to interpolated values, such as in a manner similar to a content to matrix conversion discussed above in connection with operation 110 (e.g., in a reverse fashion, etc.).

Thus, as a result, as referenced at 120, improved location-related content 122, such as content comprising a larger number of location estimates than truncated location-related content 106, for example, obtained while preserving and/or maintaining user privacy (e.g., without accessing, utilizing, etc. higher-precision latitude-longitude values, etc.) may be provided and/or made available to any suitable process and/or entity. As was also indicated, a larger number of location estimates may, for example, be utilized, in whole or in part, to more effectively and/or more efficiently infer and/or estimate users intermediate locations, such as with respect to users routes or trajectories, more confidently determine a particular side of the street (e.g., which side of the street a user is walking, etc.), a particular corner within an intersection, or the like. At times, this may facilitate and/or support providing customers with more personalized messages, more targeted offers, more relevant on-line content, or the like, such as in connection with digital content delivery services, for example. Having arrived at, provided, and/or made available improved location-related content 122, example process 100 may, for example, terminate, as referenced at 124.

Figure 2:
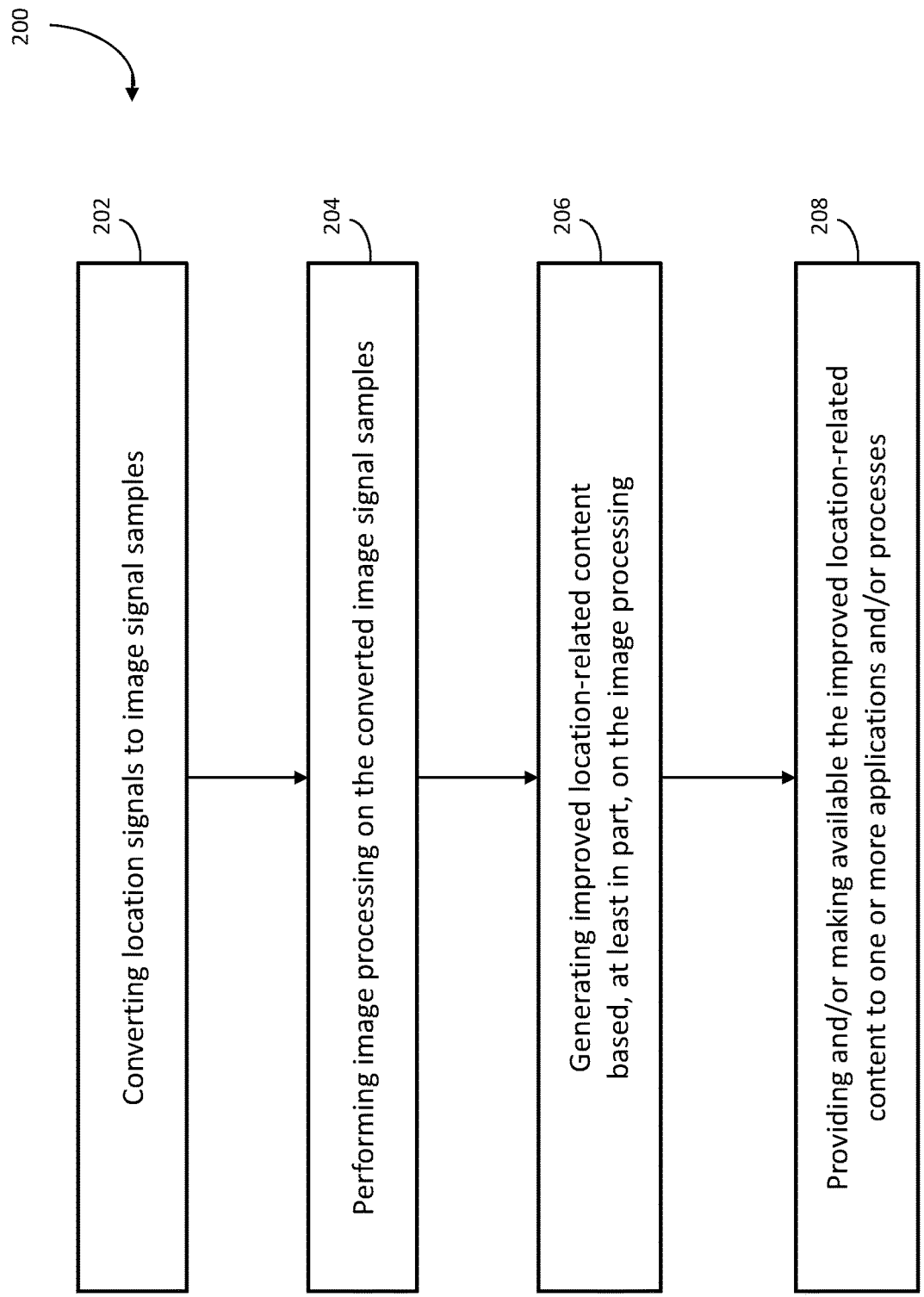
FIG. 2 is a flow diagram illustrating another implementation of a process for improving quality of location-related content.

FIG. 2 is a flow diagram illustrating another implementation of an example process, referenced herein at 200, that may be performed, in whole or in part, to facilitate and/or support one or more operations and/or techniques for improving quality of location-related content, such as truncated location-related content, for example, while preserving and/or maintaining user privacy. Likewise, at times, example process 200 may be implemented, at least in part, in connection with one or more signal processing approaches, which may include, for example, one or more image processing approaches. Similarly, it should be noted that content acquired and/or produced, such as, for example, input signals, output signals, operations, results, etc. associated with example process 200 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may likewise be performed with other aspects and/or features.

Example process 200 may, for example, begin at operation 202 with converting location signals to image signal samples. As was indicated, location signals may comprise, for example, one or more location-related values, such as represented via one or more digital signals and/or signal samples, which may include latitude-longitude values, just to illustrate one possible implementation. In some instances, location signals may also comprise, for example, altitude values, just to illustrate another possible implementation. Image signal samples may comprise, for example, image-related elements, such as image pixels comprising a particular image and, likewise, represented via one or more digital signals and/or signal samples. As was discussed, location signals may, for example, be converted to image signal samples via generating a suitable matrix. At times, it may be useful to account for a region around particular location-related values, such to improve location quality around edges of a matrix, as was also discussed. In some instances, a matrix may, for example, be converted into an image, which may include a digital image, as one possible example, such that a particular location may be representative of a pixel within the image, and a number of occurrences of latitude-longitude values at that particular location, such as obtained within a particular time window, may be representative of pixel intensity.

At operation 204, image processing on the converted image signal samples may, for example, be performed. For example, as was also discussed, an image may be resized, such as via increasing its resolution by scaling respective dimensions of a corresponding matrix by a suitable factor (e.g., by a factor of two, three, etc.). Here, one or more additional pixels in-between and/or within a range of a discrete set of known image-related pixels may, for example, be obtained, such as via bilinear interpolation. Namely, a resulting image may, for example, be scaled back or re-scaled, such as to its original size, as one possible example, utilizing one or more approaches discussed above.

With regard to operation 206, improved location-related content may, for example, be generated based, at least in part, on the image processing. For example, improved location-related content may be generated via a suitable matrix, such as to arrive at an original or like location representation. As was indicated, at times, location-related content may comprise, for example, a larger number of location estimates due, at least in part, to interpolated values, which may be used, at least in part, to infer and/or estimate whereabouts of a user in a more effective and/or efficient manner.

At operation 208, the improved location-related content may, for example, be provided and/or made available to one or more applications and/or processes. For example, in some instances, improved location-related content may be provided and/or made available to one or more applications and/or processes associated with a service provider, on-line content publisher, or the like. In some instances, improved location-related content may, for example, be employed, in whole or in part, in connection with personalized or like digital content delivery services. Of course, claimed subject matter is not so limited.

Figure 3:
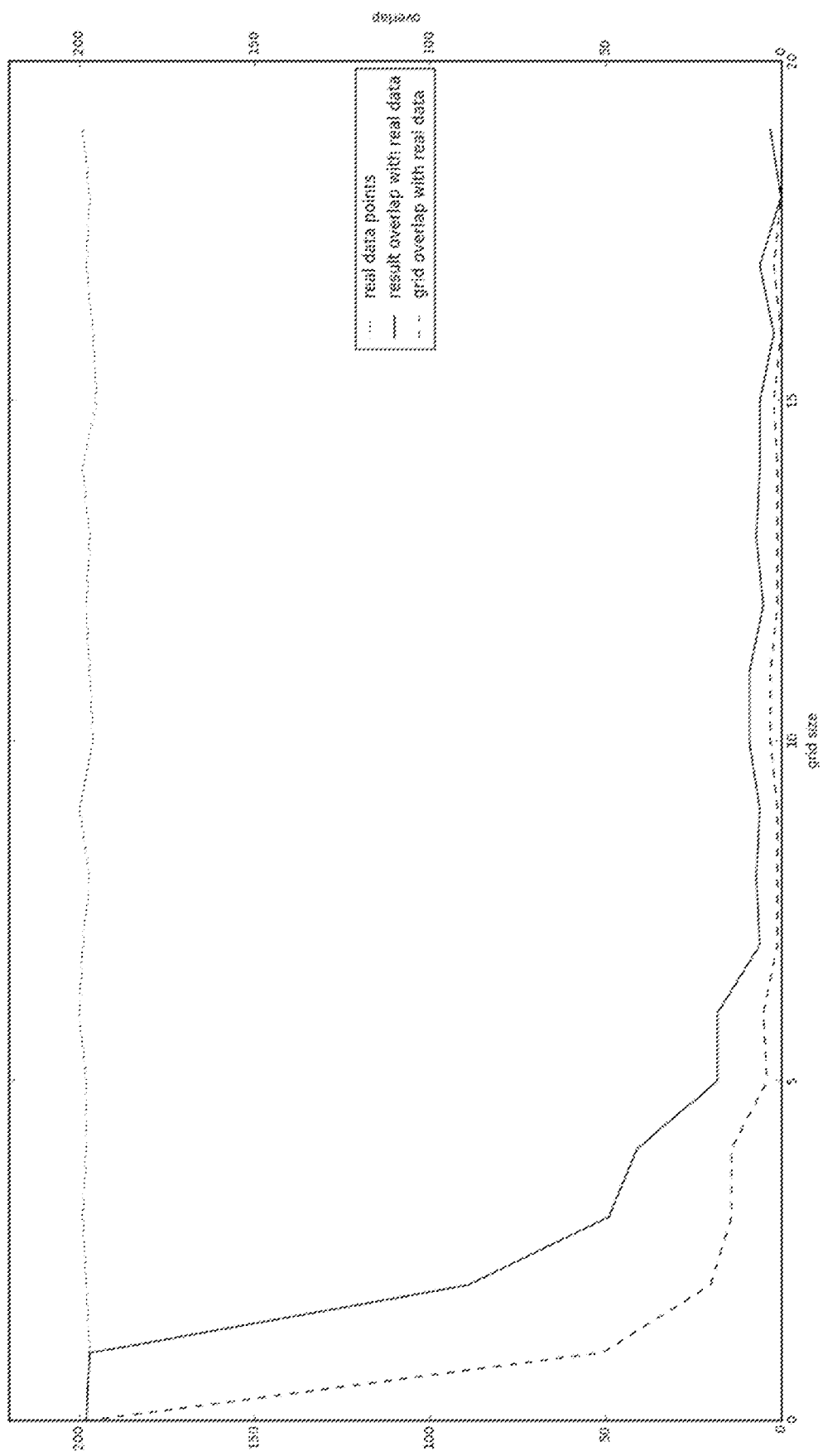
FIGS. 3-4 are graphs illustrating performances of improved location-related content.
Figure 4:
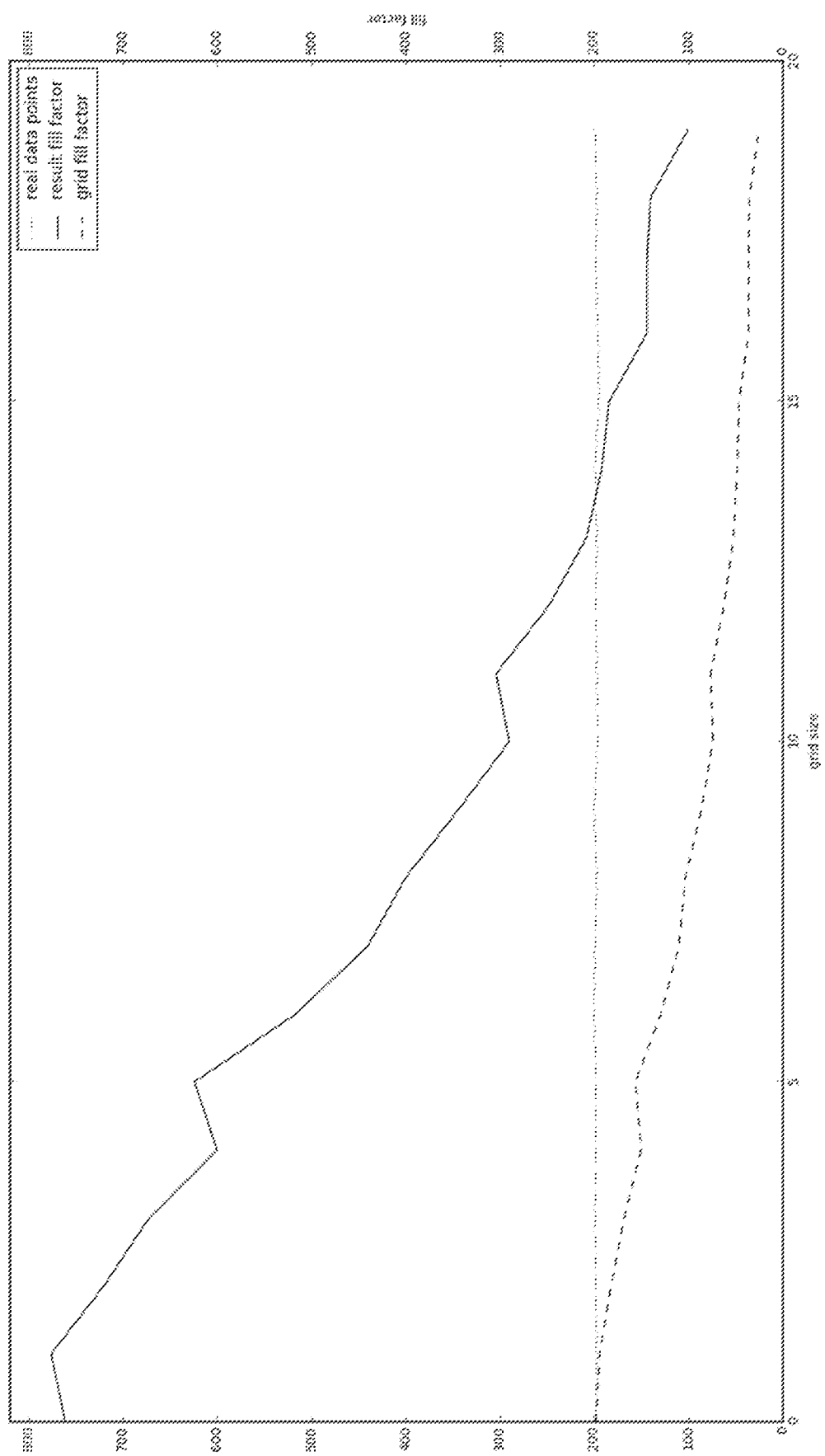

FIGS. 3-4 illustrate performances of improved (e.g., processed, etc.) location-related content, such as generated from truncated location-related content via one or more operations and/or processes discussed herein, for example, evaluated against original location-related content, such as according to a particular simulation and/or experiment. In these example evaluation plots, real content denotes artificially generated higher precision location-related content, and grid content denotes content generated from higher precision location-related content by truncating associated higher precision values, as discussed above. In FIG. 3, a left Y axis references a number of artificially generated higher precision location points, and a right Y axis references an overlap between artificially generated higher precision location-related content versus grid content, and artificially generated higher precision location-related content versus improved location-related content. Here, a grid overlap is indicative of how many non-zero matrix elements of artificially generated higher precision location-related content are also non-zero in a grid matrix (e.g., representing truncated location-related content) and a resulting matrix (e.g., representing improved location-related content). In FIG. 4, a right Y axis references a fill factor indicative of how many non-zero matrix elements have non zero values in artificially generated higher precision location-related content versus how many matrix elements have non-zero values in a grid matrix (e.g., representing truncated location-related content) and a resulting matrix (e.g., representing improved location-related content).

As seen, via utilization of one or more signal processing approaches discussed above, including one or more image processing approaches, for example, a statistically significant improvement in performances of improved location-related content appears to be achieved. More specifically, as illustrated, there is an overlap of improved location-related content with original location-related content, meaning that improved location-related content more likely includes latitude-longitude values related to an original location, which may indicate closeness of interpolated values to ground truth values. This may also indicate that a lesser number of false negatives may be observed with respect to newly-generated location-related content, for example, than with respect to grid values, which, at times, may also prove beneficial. In this context, "false negative" refers to a location error indicative of a negative location-related assumption that failed to correspond to a ground truth location (e.g., it is believed that a user was not at a particular location, while the user actually was at that location).

As also seen, at times, more false positives may, for example, be observed, such as with respect to improved (e.g., newly-generated, etc.) location-related content. This may, for example, be due, at least in part, to improved location-related content having a larger number of latent locations, such as in comparison to locations for original location-related content. In this context, "false positive" refers to a location error indicative of a positive location-related assumption that failed to correspond to a ground truth location (e.g., it is believed that a user was at a particular location, while the user actually was not at that location). As such, it appears that, in some instances, it may be desirable and/or beneficial to find an appropriate balance regarding scale factors, among others, such as while utilizing a multi-dimensional matrix, in whole or in part. At times, intensity of image pixels may, for example, be represented via any suitable weight function, such as reflecting a time window between obtaining location estimates for the same or similar location. In some instances, time may also be represented in a suitable manner, such as via an appropriate color, for example. Of course, these are merely details to which claimed subject matter is not limited.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

As was indicated, in the context of the present disclosure, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 5:
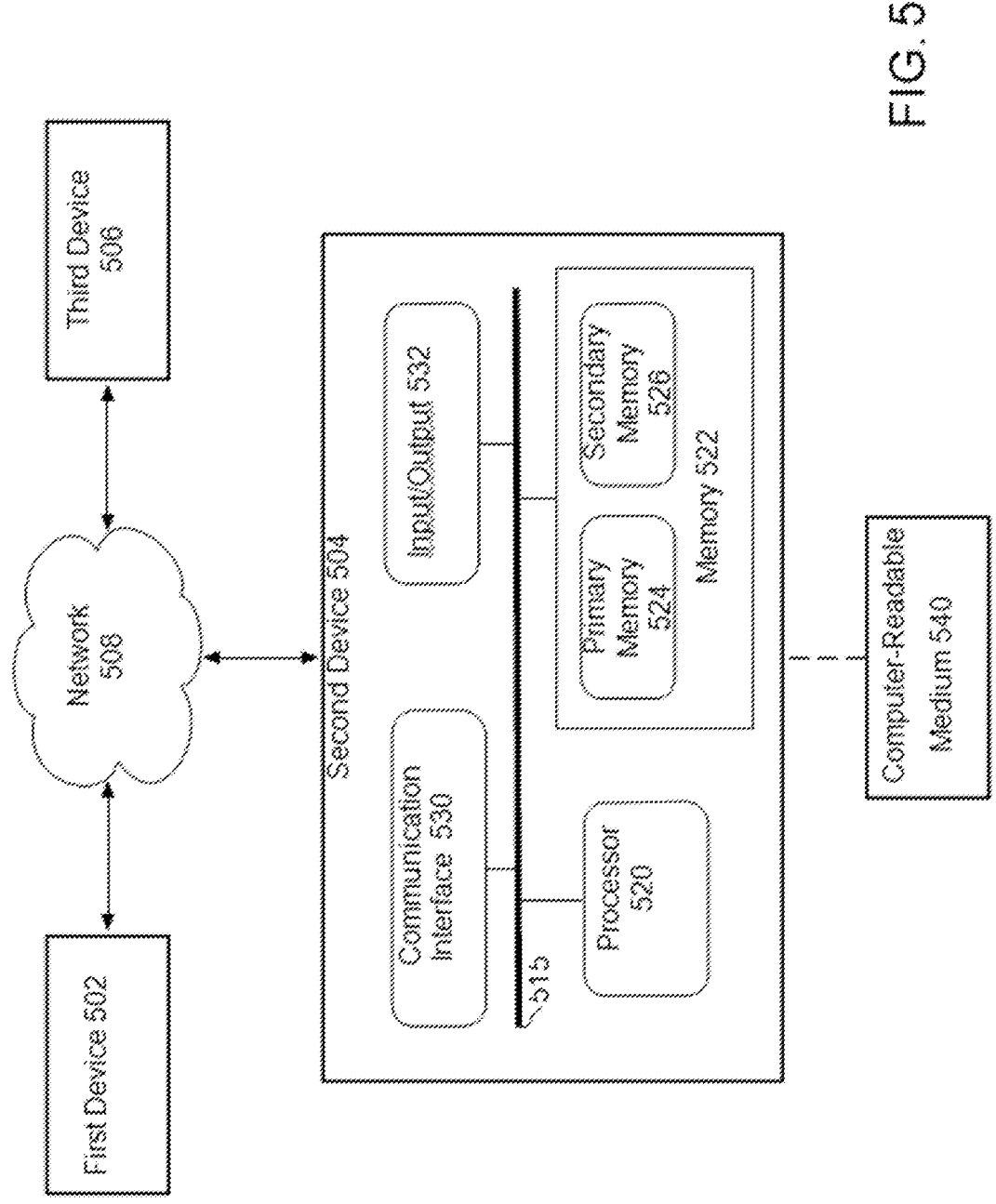
FIG. 5 is a schematic diagram illustrating an implementation of a computing device that may be employed in a client-server type interaction.

In one example embodiment, as shown in FIG. 5, a system embodiment may comprise a local network (e.g., a second device 504 and a computer-readable medium 540) and/or another type of network, such as a computing and/or communications network. For purposes of illustration, therefore, FIG. 5 shows an embodiment 500 of a system that may be employed to implement either type or both types of networks. Network 508 may comprise one or more network connections, links, processes, services, applications, and/or resources to facilitate and/or support communications, such as an exchange of communication signals, for example, between a computing device, such as 502, and another computing device, such as 506, which may, for example, comprise one or more client computing devices and/or one or more server computing device. By way of example, but not limitation, network 508 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 5 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112(f) so that it is specifically intended that 35 § USC 112(f) not be implicated by use of the term "computing device" and/or similar terms; however, if it is determined, for some reason not immediately apparent, that the foregoing understanding cannot stand and that 35 § USC 112(f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-2 and/or paragraphs of the present disclosure.

Referring now to FIG. 5, in an embodiment, first and third devices 502 and 506 may be capable of rendering a graphical user interface (GUI) for a network device and/or a computing device, for example, so that a user-operator may engage in system use. Device 504 may potentially serve a similar function in this illustration. Likewise, in FIG. 5, computing device 502 ('first device' in figure) may interface with computing device 504 ('second device' in figure), which may, for example, also comprise features of a client computing device and/or a server computing device, in an embodiment. Processor (e.g., processing device) 520 and memory 522, which may comprise primary memory 524 and secondary memory 526, may communicate by way of a communication bus 515, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 504, as depicted in FIG. 5, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (Wi-MAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 5, computing device 502 may provide one or more sources of executable computer instructions in the form physical states and/or signals (e.g., stored in memory states), for example. Computing device 502 may communicate with computing device 504 by way of a network connection, such as via network 508, for example. As previously mentioned, a connection, while physical, may not necessarily be tangible. Although computing device 504 of FIG. 5 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 522 may comprise any non-transitory storage mechanism. Memory 522 may comprise, for example, primary memory 524 and secondary memory 526, additional memory circuits, mechanisms, or combinations thereof may be used. Memory 522 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 522 may be utilized to store a program of executable computer instructions. For example, processor 520 may fetch executable instructions from memory and proceed to execute the fetched instructions. Memory 522 may also comprise a memory controller for accessing device readable-medium 540 that may carry and/or make accessible digital content, which may include code, and/or instructions, for example, executable by processor 520 and/or some other device, such as a controller, as one example, capable of executing computer instructions, for example. Under direction of processor 520, a non-transitory memory, such as memory cells storing physical states (e.g., memory states), comprising, for example, a program of executable computer instructions, may be executed by processor 520 and able to generate signals to be communicated via a network, for example, as previously described. Generated signals may also be stored in memory, also previously suggested.

Memory 522 may store electronic files and/or electronic documents, such as relating to one or more users, and may also comprise a device-readable medium that may carry and/or make accessible content, including code and/or instructions, for example, executable by processor 520 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 5, processor 520 may comprise one or more circuits, such as digital circuits, to perform at least a portion of a computing procedure and/or process. By way of example, but not limitation, processor 520 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 520 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 5 also illustrates device 504 as including a component 532 operable with input/output devices, for example, so that signals and/or states may be appropriately communicated between devices, such as device 504 and an input device and/or device 504 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:

obtaining, by at least one computing device, data including a plurality of sets of geographic location coordinates that correspond to geographic locations of client devices, at least a portion of the plurality of sets of geographic location coordinates being truncated, each of the plurality of sets of geographic location coordinates including a pair of latitude-longitude values;

converting, by the at least one computing device, the plurality of sets of geographic location coordinates to an image including a first plurality of pixels represented via a first plurality of non-zero pixel intensity values, the image denoting a geographic area, each of the first plurality of non-zero pixel intensity values corresponding to at least one of the plurality of sets of geographic location coordinates and indicating a frequency of occurrences of the one of the plurality of sets of geographic location coordinates in the data, wherein a position of each pixel of the first plurality of pixels within the image corresponds to a pair of latitude-longitude values of a corresponding set of geographic location coordinates;

performing, by the at least one computing device, image processing on the image to generate a modified image including a second plurality of pixels represented via a second plurality of pixel intensity values, each of the second plurality of pixel intensity values corresponding to a different one of a plurality of geographic areas, each of the second plurality of pixel intensity values representing a probability of a corresponding one of the client devices being at a corresponding one of the plurality of geographic areas, wherein image processing comprises applying a linear interpolation such that a number of the second plurality of pixels in the modified image is greater than a number of the first plurality of pixels in the image, the modified image being of a higher resolution than the image;

performing a second linear interpolation, in a different direction than the linear interpolation, to scale the modified image back to a previous size associated with the modified image;

storing, by the at least one computing device, results of scaling the modified image back to the previous size;

identifying content for a particular one of the client devices based, at least in part, on the results of scaling the modified image back to the previous size; and transmitting the content to the particular one of the client devices.

2. The method of claim 1, comprising determining whether a number of latitude-longitude values in the plurality of sets of geographic location coordinates is more than a threshold number.

3. The method of claim 2, comprising responsive to determining that the number of latitude-longitude values in the plurality of sets of geographic location coordinates is more than the threshold number, generating a matrix representative of the plurality of sets of geographic location coordinates.

4. The method of claim 3, wherein generating the matrix comprises using a buffer to improve quality of truncated location-related content.

5. The method of claim 4, comprising determining the buffer based, at least in part, on at least one of a client device, location-related content, a service provider, or an application.

6. The method of claim 2, comprising determining the threshold number based, at least in part, on a client device.

7. The method of claim 2, comprising determining the threshold number based, at least in part, on location-related content.

8. The method of claim 2, comprising determining the threshold number based, at least in part, on at least one of a service provider or an application.

9. The method of claim 1, wherein applying the linear interpolation generates one or more additional pixels.

10. The method of claim 9, wherein the one or more additional pixels having intensity values corresponding to one or more location estimates.

11. The method of claim 1, each of the plurality of geographic areas corresponding to at least one geographic location.

12. The method of claim 1, wherein the linear interpolation is applied based, at least in part, on weights.

13. The method of claim 12, wherein the weights are assigned to at least a portion of the first plurality of non-zero pixel intensity values.

14. The method of claim 1, wherein the modified image denotes the geographic area.

15. The method of claim 1, comprising:
estimating a location of a user of the particular one of the client devices using the results of scaling the modified image back to the previous size.

16. The method of claim 15,
wherein identifying the content is performed based, at least in part, on the location of the user.

17. The method of claim 16, the location being an intermediate location with respect to at least one of a user route or trajectory.

18. An apparatus comprising:
at least one computing device, the at least one computing device including at least one processor and at least one memory, the processor and memory configured to:
obtain data including a plurality of sets of geographic location coordinates that correspond to geographic locations of client devices, at least a portion of the plurality of sets of geographic location coordinates being truncated, each of the plurality of sets of geographic location coordinates including a pair of latitude-longitude values;
convert the plurality of sets of geographic location coordinates to an image including a first plurality of pixels represented via a first plurality of non-zero pixel intensity values, the image denoting a geographic area, each of the first plurality of non-zero pixel intensity values corresponding to at least one of the plurality of sets of geographic location coordinates and indicating a frequency of occurrences of the one of the plurality of sets of geographic location coordinates in the data, wherein a position of each pixel of the first plurality of pixels within the image corresponds to a pair of latitude-longitude values of a corresponding set of geographic location coordinates;
perform image processing on the image to generate a modified image including a second plurality of pixels represented via a second plurality of pixel intensity values, each of the second plurality of pixel intensity values corresponding to a different one of a plurality of geographic areas, each of the second plurality of pixel intensity values representing a probability of a corresponding one of the client devices being at a corresponding one of the plurality of geographic areas, wherein image processing comprises applying a linear interpolation such that a number of the second plurality of pixels in the modified image is greater than a number of the first plurality of pixels in the image, the modified image being of a higher resolution than the image;
perform a second linear interpolation, in a different direction than the linear interpolation, to scale the modified image back to a previous size associated with the modified image;
store results of scaling the modified image back to the previous size;
identify content for a particular one of the client devices based, at least in part, on the results of scaling the modified image back to the previous size; and
transmit the content to the particular one of the client devices.

19. The apparatus of claim 18, the processor and memory configured to:
convert the frequency of occurrences of a particular one of the plurality of sets of geographic location coordinates in the data, for a particular one of the geographic locations represented via the particular one of the plurality of sets of geographic location coordinates, to a corresponding one of a first plurality of pixel intensity values.

20. The apparatus of claim 19, wherein each of the first plurality of pixel intensity values corresponds to a number of occurrences of a particular set of geographic location coordinates, for a particular geographic location, obtained within a particular time window.

21. A computer program product comprising at least one non-transitory computer readable storage medium having computer program instructions stored thereon, the computer program instructions being configured such that, when executed by one or more processors, the computer program instructions cause the one or more processors to:

obtain data including a plurality of sets of geographic location coordinates that correspond to geographic locations of client devices, at least a portion of the plurality of sets of geographic location coordinates being truncated, each of the plurality of sets of geographic location coordinates including a pair of latitude-longitude values;

convert the plurality of sets of geographic location coordinates to an image including a first plurality of pixels represented via a first plurality of non-zero pixel intensity values, the image denoting a geographic area, each of the first plurality of non-zero pixel intensity values corresponding to at least one of the plurality of sets of geographic location coordinates and indicating a frequency of occurrences of the one of the plurality of sets of geographic location coordinates in the data, wherein a position of each pixel of the first plurality of pixels within the image corresponds to a pair of latitude-longitude values of a corresponding set of geographic location coordinates;

perform image processing on the image to generate a modified image including a second plurality of pixels represented via a second plurality of pixel intensity values, each of the second plurality of pixel intensity values corresponding to a different one of a plurality of geographic areas, each of the second plurality of pixel intensity values representing a probability of a corresponding one of the client devices being at a corresponding one of the plurality of geographic areas, wherein image processing comprises applying a linear interpolation such that a number of the second plurality of pixels in the modified image is greater than a number of the first plurality of pixels in the image, the modified image being of a higher resolution than the image;

performing a second linear interpolation, in a different direction than the linear interpolation, to scale the modified image back to a previous size associated with the modified image;

store results of scaling the modified image back to the previous size;

identify content for a particular one of the client devices based, at least in part, on the results; and transmit the content to the particular one of the client devices.

22. The computer program product of claim 21, each of the first plurality of non-zero pixel intensity values corresponding to a number of occurrences of a corresponding set of geographic location coordinates, for a corresponding one of the geographic locations, within a particular time window.

* * * * *